Jan. 21, 1958  W. A. RINGLER  2,820,570
COLLAPSIBLE BOTTLE CARRIERS
Filed Nov. 19, 1951  8 Sheets-Sheet 1
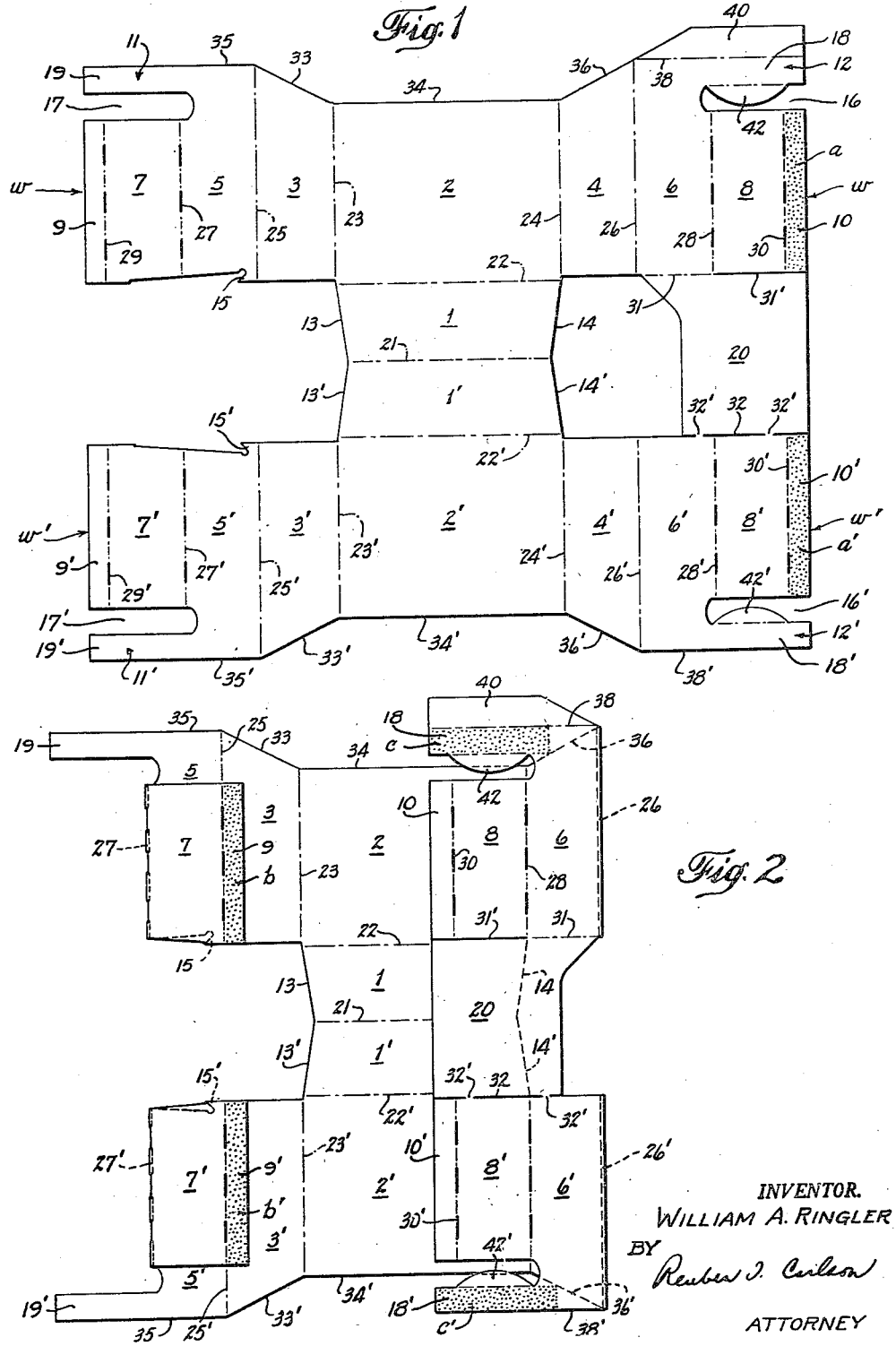
INVENTOR.
WILLIAM A. RINGLER
BY
ATTORNEY Jan. 21, 1958 W. A. RINGLER 2,820,570
COLLAPSIBLE BOTTLE CARRIERS
Filed Nov. 19, 1951 8 Sheets-Sheet 2

INVENTOR.
WILLIAM A. RINGLER
BY
Reuben J. Carlson
ATTORNEY

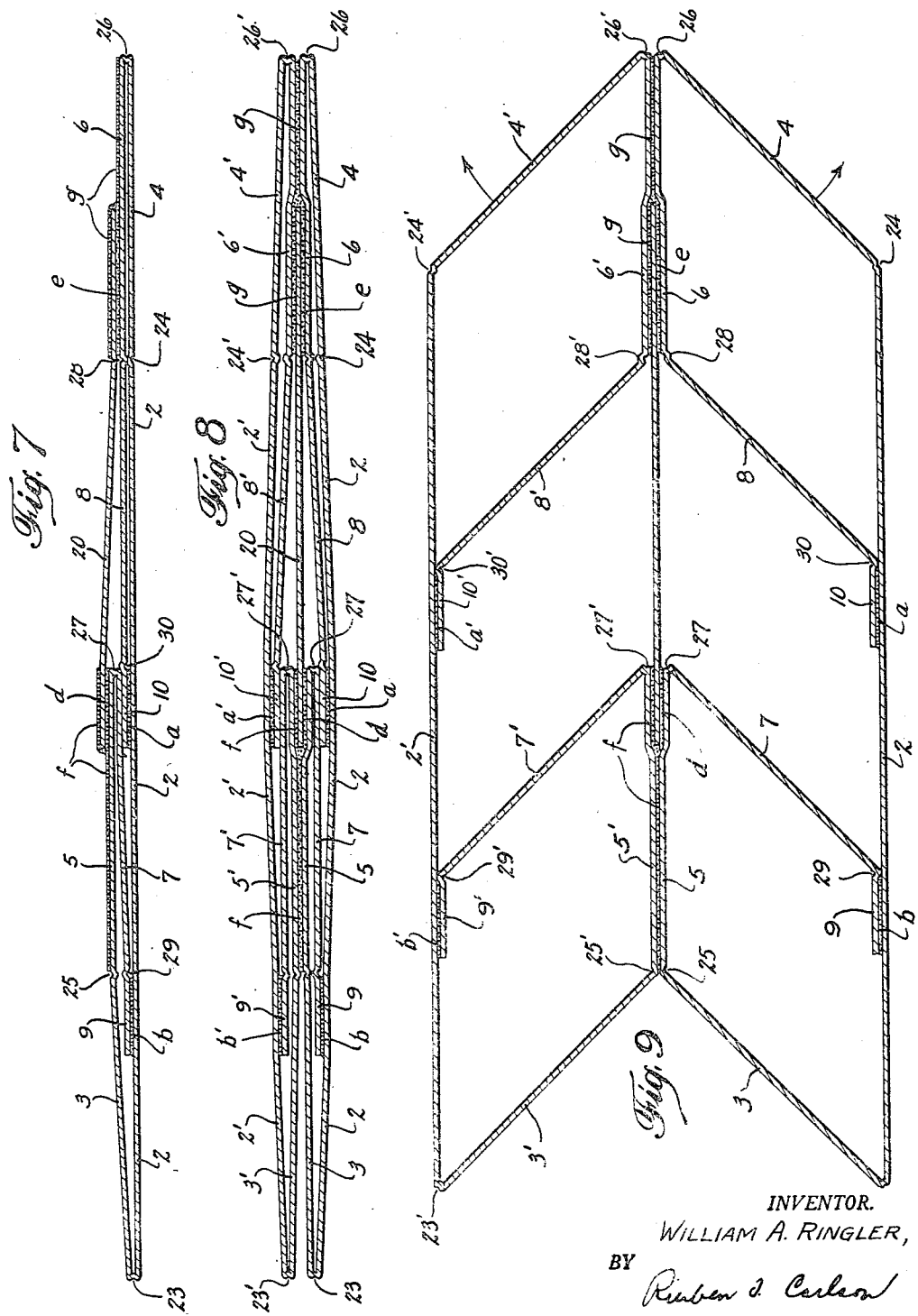

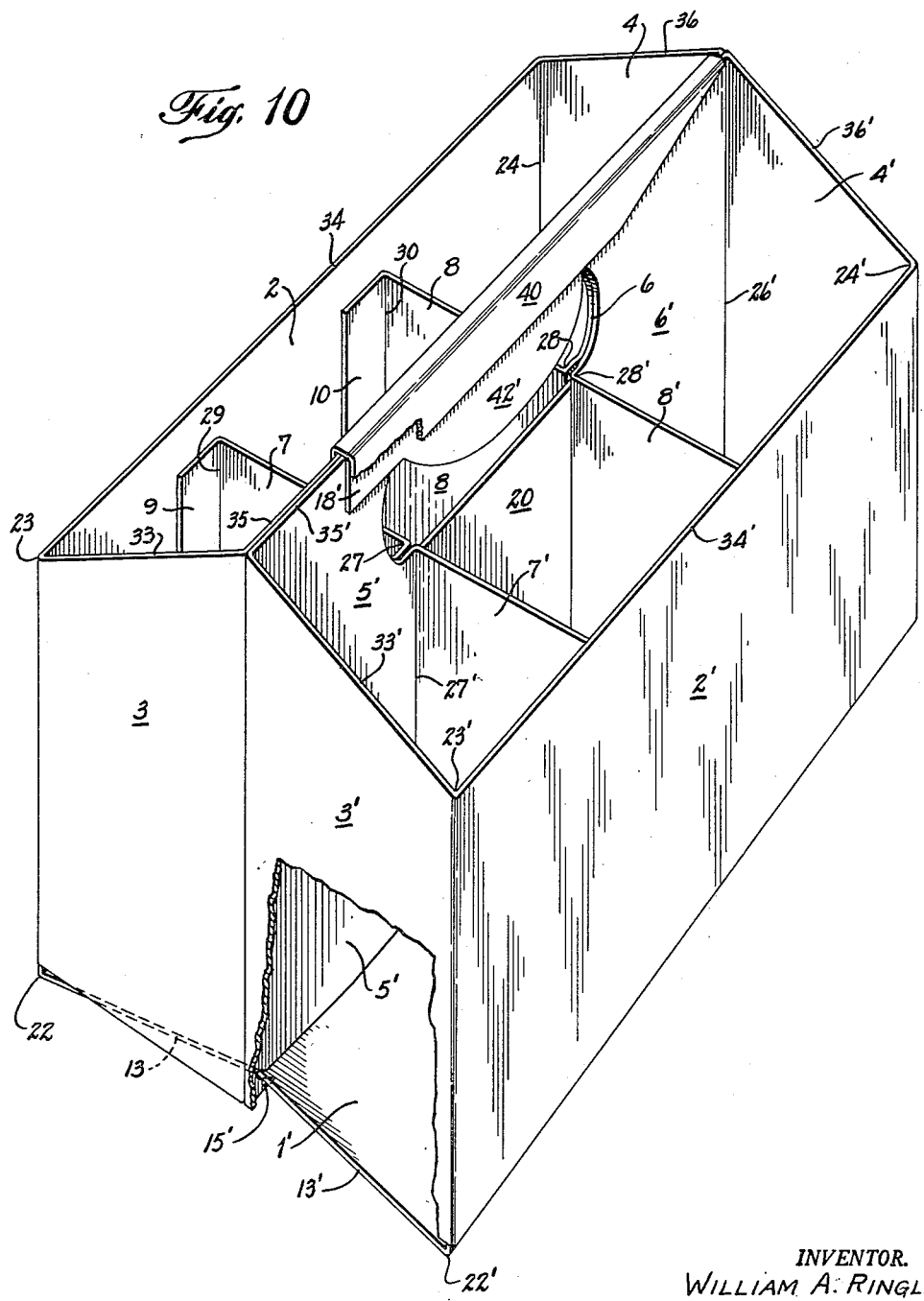

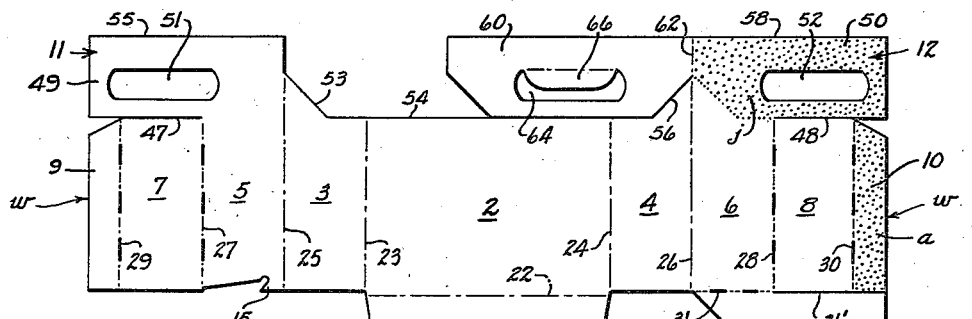

Jan. 21, 1958 W. A. RINGLER 2,820,570
COLLAPSIBLE BOTTLE CARRIERS
Filed Nov. 19, 1951 8 Sheets-Sheet 6
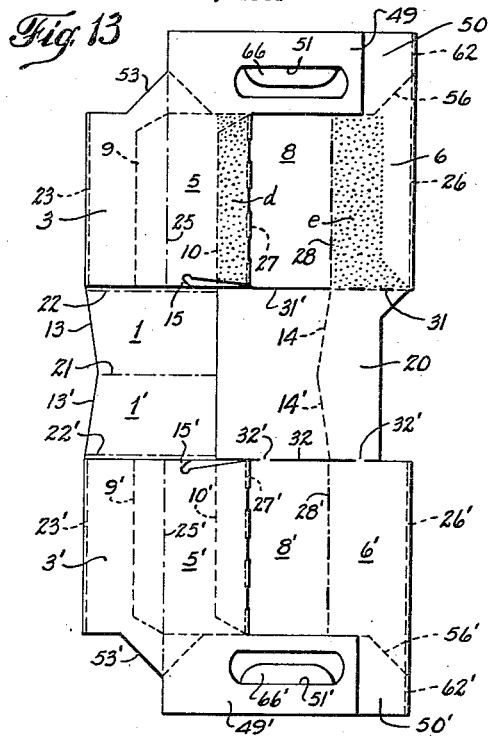
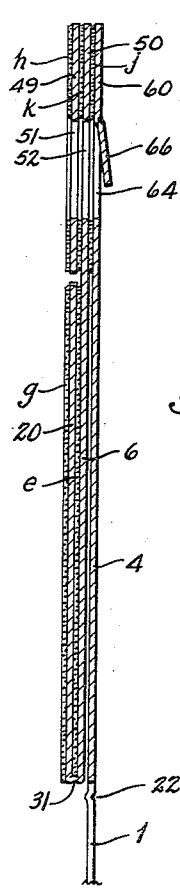
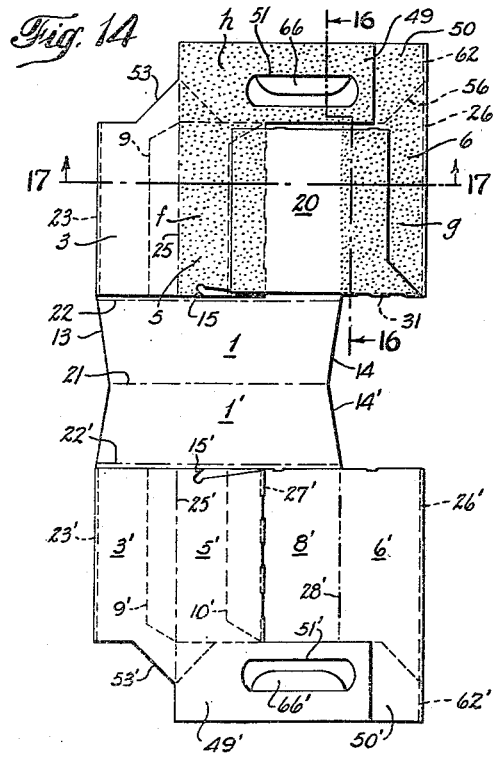
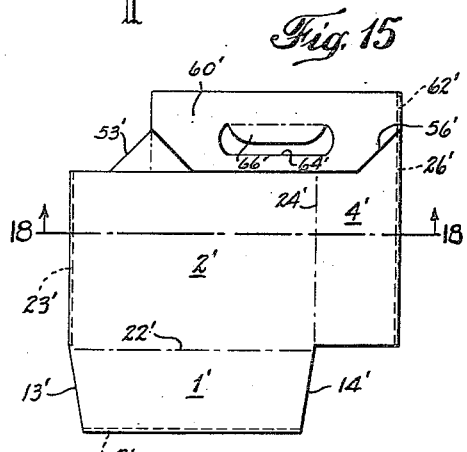
INVENTOR.
WILLIAM A. RINGLER
BY
Reuben J. Carlson
ATTORNEY.

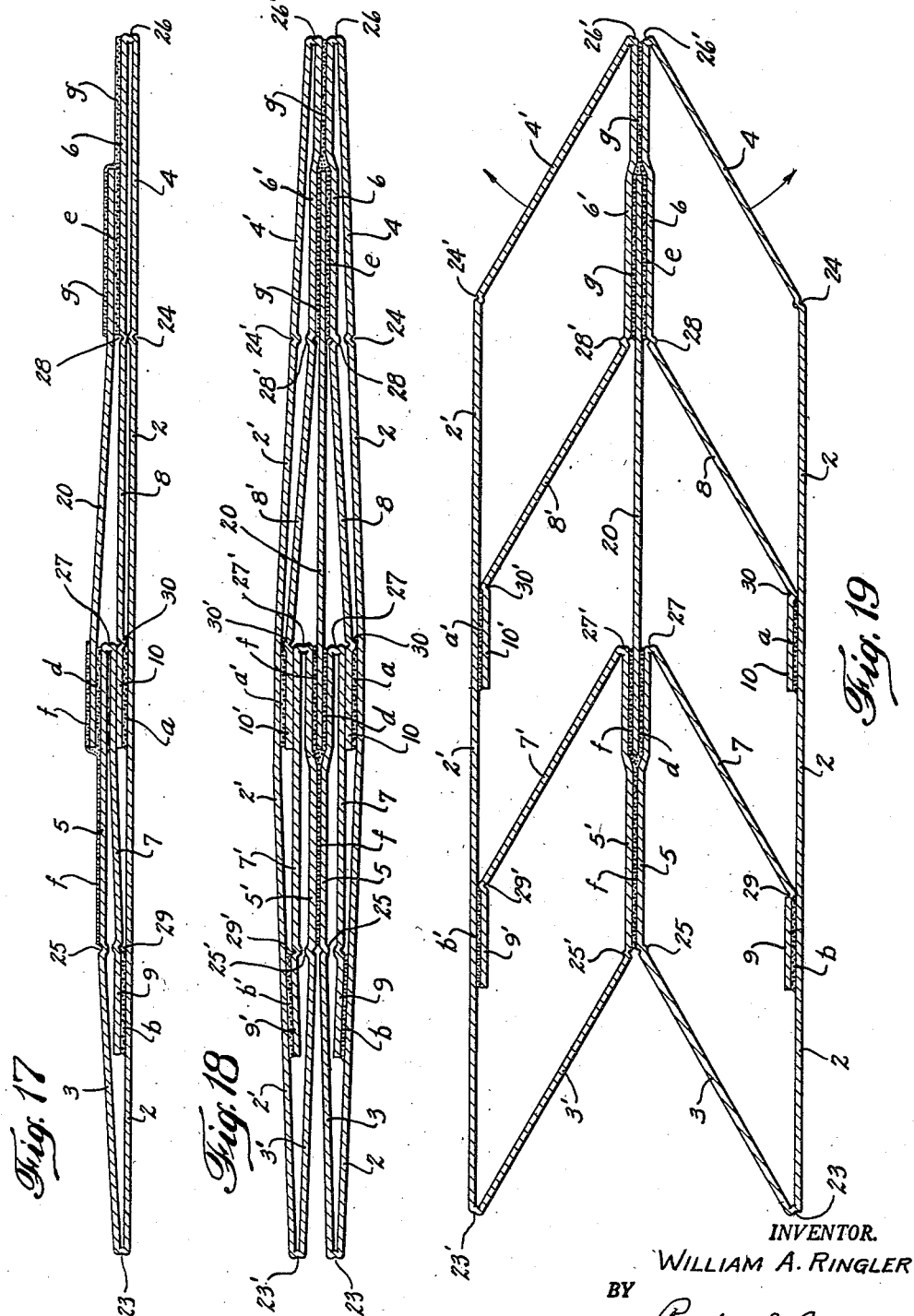

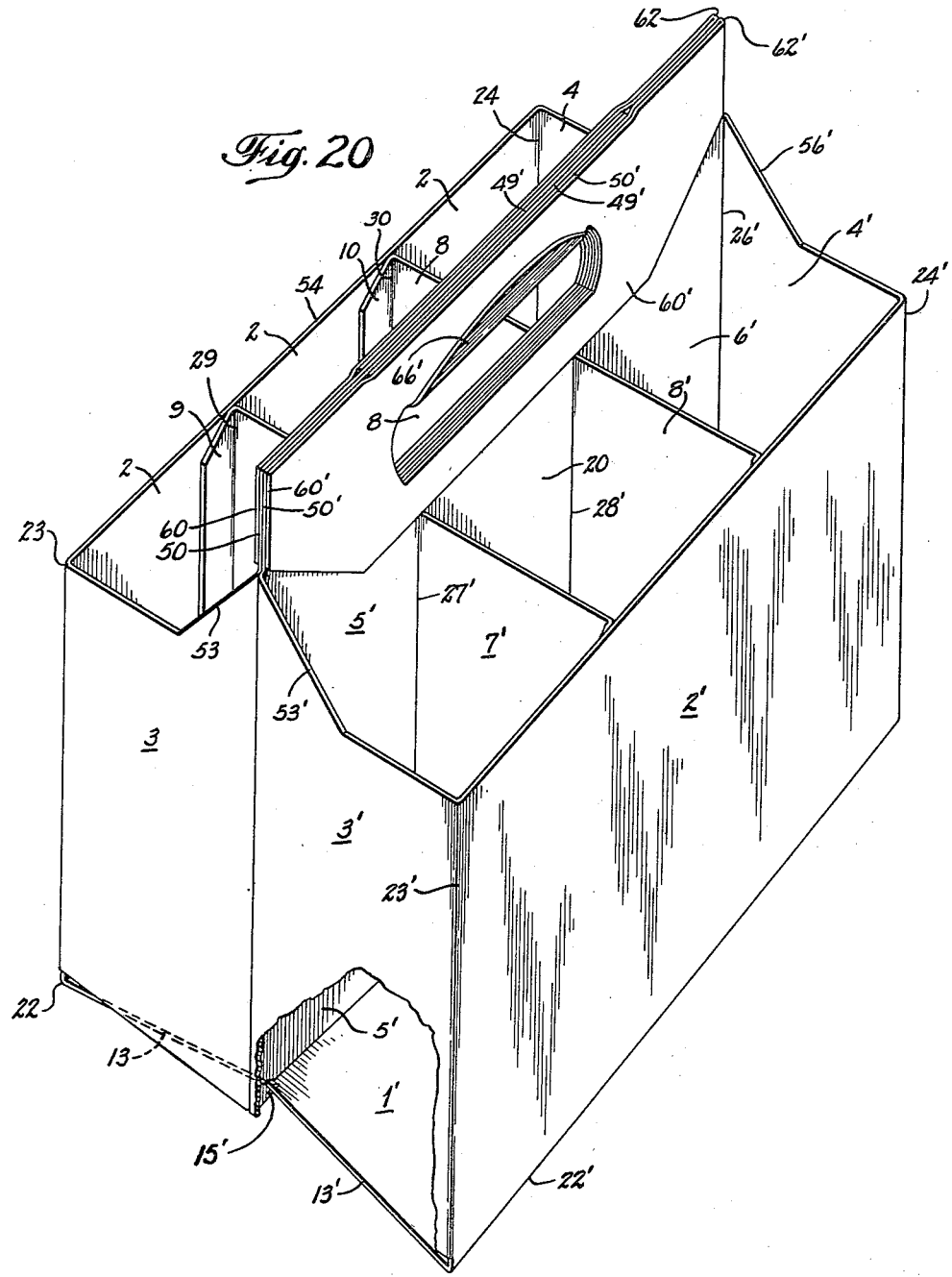

United States Patent Office 2,820,570
Patented Jan. 21, 1958

2,820,570

COLLAPSIBLE BOTTLE CARRIERS

William A. Ringler, Wayne, Pa., assignor, by mesne assignments, to The Diamond Match Company, New York, N. Y., a corporation of Delaware Application November 19, 1951, Serial No. 256,971

The portion of the term of the patent subsequent to December 14, 1971, has been disclaimed 10 Claims. (Cl. 220—113)

This invention relates to collapsible bottle carriers, and more particularly to twin compartmented multicelled bottle carriers formed from paperboard or fiberboard materials which are designed to permit flat collapse thereof during shipment and storage and convenient erection for bottle filling and transportation.

The large and increasing consumer demand for bottled soft drinks, beer and other bottled beverages, has made it desirable and necessary for the beverage bottling and distributing industry to furnish with their respective beverage products attractive bottle holders or carriers by means of which the consumer may conveniently transport and receive delivery of a plurality of beverage filled bottles and conveniently return the empty bottles to the beverage bottler or distributor. In order to effectively and economically pack the beverage bottles in bottle carriers, distribute the bottle filled carriers to the retailer or consumer, and remove the empty bottles from the returned carriers, beverage bottlers and distributors have found it increasingly desirable to install systemitized handling equipment for filling the carriers, for placing the carriers in the low walls distributor cases as commonly used, for handling, stacking and transporting the carrier filled distribution cases, and for removal of the empty bottles from the returned carriers so that they may be expeditiously washed and cleansed before reuse. These factors have imposed exacting requirements with respect to the form and construction of bottle carriers which are not met by many of the bottle carriers as heretofore made and used.

Bottle carriers made in accordance with this invention are designed to satisfy the exacting requirements of the beverage bottling and distributing industry. These carriers are also designed and constructed to permit low-cost manufacture and assembly thereof, to provide carriers which are durable and lasting in use, convenient and attractive for consumer handling, rigid and sturdy when erected, provide cushioned protection and retainment of the bottles inserted therein, and additionally present substantial flat surface areas for the reception of attractive advertising decoration, with the bottles therein adequately displayed.

In construction, these bottle carriers present flat side and end wall panels which extend when erected from the flat bottom panel to any desired height. The handle section, which extends medially between the opposite and similar bottle receiving compartmented sections, is of multiply thickness and may be made from four to six plys in thickness. The multiply handle section is integrally joined at both ends thereof to double ply center partition sections which extend inwardly from both ends of the carrier, are foldably connected to the end panel sections, and extend down to the expanded and erected bottom panel. The cell forming cross partitions may also be made to the height of the side panels and extend down to the expanded and erected bottom panel. The cross partitions are firmly but foldably secured to the interior faces of the side panels and to the double ply center partition sections. A center divider extends down to the expanded bottom panel and its side edges are secured in sandwiched relation between the paired end cell cross partition sections. As thus constructed, these carriers are rigid and sturdy when erected, unyielding to bottle load strains, and are convenient to collapse and erect.

Additionally, these improved bottle carriers are designed to present the top horizontal edges of the handle sections below the top ends of the bottles packaged therein so that the bottle filled carriers may be stacked to rest on the tops of the bottles, and with the end edges of the bottom panel contained within its associated end panel sections so that any selected carrier may be removed from the distributor case without interference from the adjacent carriers packed therein.

These carriers are additionally designed to permit their formation from one-piece blanks which can be scored and cut from stock sheets of selected paperboard or fiberboard material previously finished, imprinted and decorated on one side thereof only, with very little waste of stock sheet material. These carrier blanks are also particularly designed to permit high speed gluing and folding thereof into completed bottle carriers in collapsed form suitable for storage and shipment, in a single pass through a substantially standard folding and gluing machine. As a result, these high quality, durable and attractive bottle carriers can be manufactured at relatively low cost.

Other objects and advantages of this invention will become apparent as the disclosure proceeds.

Although the characteristic features of this invention will be particularly pointed out in the claims appended hereto, the invention itself, and the manner in which it may be carried out, may be better understood by referring to the following description taken in connection with the accompanying drawings forming a part hereof, in which Fig. 1 is an inside face view of the blank as cut and scored from a paperboard or fiberboard stock sheet for assembly into the bottle carrier, this view also showing adhesive applied to certain areas thereof preliminary to the initial folding operation;

Fig. 2 is an inside face view of the blank shown in Fig. 1 after the initial folding operation has been completed, this view also showing adhesive applied to additional areas thereof preparatory to the second folding operation;

Fig. 7 is an enlarged horizontal cross sectional view of the partially folded blank as it would appear when viewed along the line 7—7 of Fig. 4;

Fig. 8 is an enlarged horizontal cross sectional view of the fully assembled collapsed carrier as the same would appear when viewed along line 8—8 of Fig. 6;

Fig. 9 is a horizontal cross sectional view of the assembled carrier as the same would appear when undergoing erection expansion from its collapsed form shown in Figs. 6 and 8;

Fig. 10 is a perspective view of the fully erected carrier as formed from the blank shown in Fig. 1, certain parts being broken away to illustrate structural details;

Fig. 11 is an inside face view of a modified form of blank as cut and scored from a paperboard of fiberboard stock sheet for assembly into the modified form of carrier shown in Fig. 20, this view also showing adhesive applied to certain areas thereof preliminary to the initial folding operation;

Fig. 12 is an inside face view of the blank shown in Fig. 11 after the initial folding operation has been performed thereon, this view also showing adhesive applied to additional areas thereof preparatory to the second folding operation;

Fig. 13 is an inside face view of the blank shown in Fig. 12 as the same would appear when the second folding operation has been performed thereon, this view showing adhesive applied to further areas of the blank in preparation for the third folding operation;

Fig. 14 is an inside face view of the blank shown in Fig. 13 as it would appear after the third folding operation has been performed thereon, this view also showing adhesive applied to still further areas of the blank in preparation for the following final folding operation;

Fig. 15 is a plan view of the completed carrier in collapsed form as it would appear after the fourth folding operation has been performed on the blank shown in Fig. 14;

Fig. 16 is a fragmentary vertical cross sectional view taken through the handle section of the partially folded blank as it would appear when viewed along line 16—16 of Fig. 14;

Fig. 17 is a horizontal cross vertical view of the partially folded blank as viewed along line 17—17 of Fig. 14;

Fig. 18 is a horizontal cross sectional view of the fully assembled collapsed carrier as the same would appear when viewed along line 18—18 of Fig. 15;

Fig. 19 is a horizontal cross sectional view of the assembled carrier as the same would appear when undergoing erection expansion from its collapsed form as shown in Figs. 15 and 18; and Fig. 20 is a perspective view of the fully erected carrier formed from the blank as shown in Fig. 11, certain parts being broken away to illustrate structural details.

Similar reference characters refer to similar parts throughout the several views of the drawings and specification.

Figure 3:
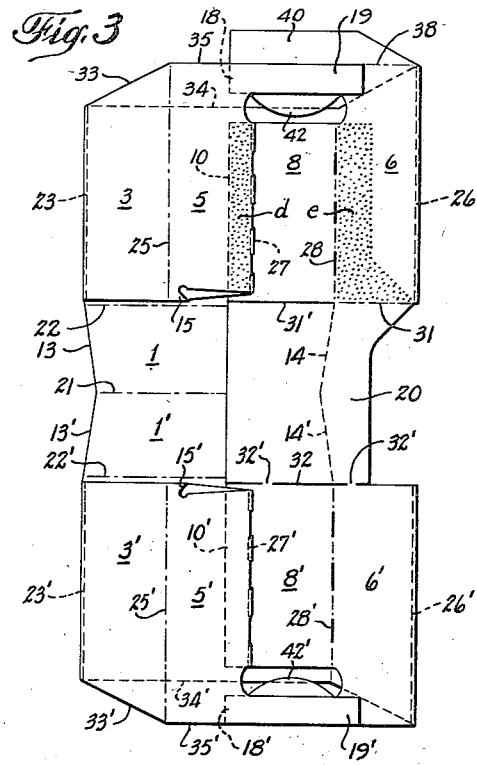
Fig. 3 is an inside face view of the blank shown in Fig. 2 as the same would appear when the second folding operation has been completed, this view showing adhesive applied to further areas of the blank in preparation for the third folding operation.

The improved bottle carriers of this invention may be advantageously made from paperboard of fiberboard blanks of generally H-shaped form as indicated in Figs. 1 and 11. In their manufacture, large size paperboard or fiberboard stock sheets of selected quality are printed and decorated on one side thereof only, and the carrier forming blanks may then be scored and cut therefrom in a single pass through a cutting and scoring machine, adjusted to perform the requisite cutting and scoring operations. The carrier forming blanks are so shaped and designed to yield very little waste of stock sheet material, and to permit high speed gluing and folding of the carrier forming blanks in a single pass through an automatic gluing and folding machine of substantially standard construction. As a result, high speed and low cost production of bottle carriers may be attained. The bottle carriers made and produced in accordance with this invention are sturdy and strong in construction, durable in use, and adequately satisfy the exacting requirements of the beverage bottling and distributing industry.

These improved bottle carriers, made from the blanks as shown in Figs. 1 and 11 are cut and scored to provide a bottom panel particularly designed to support two rows of bottles with three bottles in each row. The bottom panel comprises bottom half sections 1 and 1' of similar size, hingedly connected along a longitudinally extending collapsing score 21. Side panels 2 and 2' are hingedly connected to the opposite side edge of bottom sections 1 and 1' along parallel extending scores 22 and 22' which are also parallel to the bottom collapsing score 21. Wings w and w' may be made to extend from both side edges of the side panels 2 and 2' respectively as shown in Figs. 1 and 11 to form a bottle carrier blank which is generally H-shaped in configuration.

The left hand wings of the blanks as shown in Figs. 1 and 11 are scored to form a pair of end wall panel sections 3 and 3' foldably connected along score lines 23 and 23' to the adjacent side edges of the side panels 2 and 2' respectively. A pair of end cell center partition sections 5 and 5' are foldably connected along score lines 25 and 25' to the respective end panels 3 and 3'. Cross partitions 7 and 7' are foldably connected along score lines 27 and 27' to the respective center partition sections 5 and 5' with a pair of side wall securing flaps 9 and 9' foldably connected along score lines 29 and 29' to the respective cross partitions 7 and 7'. The score lines 23, 25, 27 and 29 of the blanks shown in Figs. 1 and 11 are preferably arranged in substantially parallel and equally spaced relationship, and in substantial alignment with score lines 23', 25', 27' and 29', respectively. As thus formed and defined, the end panel sections, 3 and 3', the center partition sections 5 and 5' and the cross partitions 7 and 7' are of substantially uniform width, which width approximates the diameter of the bottles to be contained in the carrier assembled therefrom.

The wing extensions w and w' at the right hand side of the blanks shown in Figs. 1 and 11, are also scored to form a pair of end panel sections 4 and 4' foldably connected along score lines 24 and 24' to the adjacent side edges of the respective side panels 2 and 2'. A pair of end cell center partition sections 6 and 6' are foldably connected along score lines 26 and 26' to the respective end panel sections 4 and 4'; a pair of cross partitions 8 and 8' are foldably connected along score lines 28 and 28' to the respective center partition sections 6 and 6'; and a pair of side panel securing flaps 10 and 10' are foldably connected along score lines 30 and 30' to the respective cross partitions 8 and 8'. The scores 24, 26, 28 and 30 are substantially in alignment with the corresponding scores 24', 26', 28' and 30' and are substantially equally spaced so that the end panel sections 4 and 4', the center partition sections 6 and 6', and the cross partitions 8 and 8' have a width throughout which closely approximates the diameter of the bottles to be placed in the carrier assembled therefrom.

As thus scored, the wing extensions w and w' are designed when glued and folded to provide a double compartmented bottle carrier with a pair of end cells at both ends thereof, with the end panel sections 3 and 3', center partition sections 5 and 5' and cross partitions 7 and 7' forming one pair of fully enclosed end cells at one end of the carrier, and with end panel sections 4 and 4', center partition sections 6 and 6' and cross partitions 8 and 8' forming another pair of fully enclosed end cells at the other end of the carrier. Additionally, the spaced cross partitions 7 and 8 define an intermediate bottle receiving cell in one half section and the spaced cross partitions 7' and 8' together define an intermediate cell in the other half section of the assembled and erected carrier. The intermediate cells as thus formed are separated medially of the carrier by a center divider 20 which is captured from material otherwise discarded as waste between an adjacent pair of wing extensions w and w'.

Carriers formed from the blanks shown in Figs. 1 and 11 are also equipped with a multi-ply thickness carrying handle forming an integral part of the blanks from which these carriers are formed. The carrying handle may be formed from two or more handle forming extensions projecting laterally from two or more of the center partition sections and secured to each other and the other center partition sections in overlapped relationship. As illustrated in Figs. 1 and 11, unscored handle forming extensions 11 and 11' project laterally from the respective center partition sections 5 and 5', and are separated from the adjacent cross partitions 7 and 7' and securing flaps 9 and 9'. Unscored handle forming extensions 12 and 12' may also be provided to project laterally from the center partition sections 6 and 6', and are separated from the adjacent cross partitions 8 and 8' and securing flaps 10 and 10'. The handle forming extensions 11 and 11', 12 and 12' are so made as to overlap when the blanks are glued and folded to thereby provide a handle section for the carrier of multi-ply thickness which is joined to the center partition sections 5 and 5', 6 and 6'.

Figure 4:
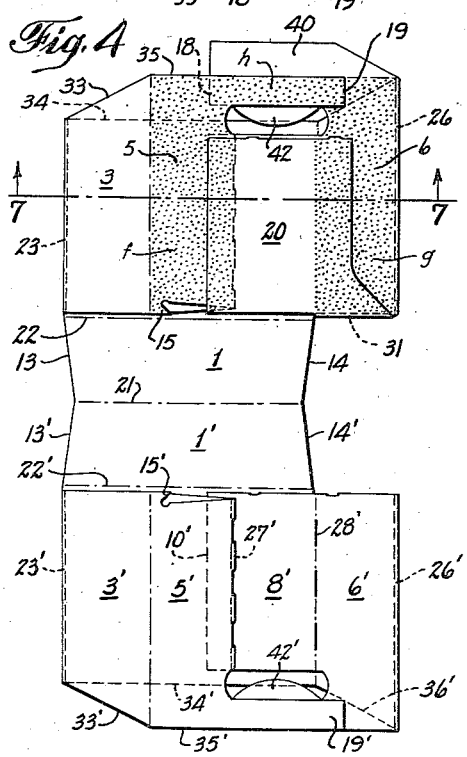
Fig. 4 is an inside face view of the blank shown in Fig. 3 as it would appear after the third folding operation has been executed, this view also showing adhesive applied to still further areas of the blank preparatory to performance of the fourth folding operation.

In the blanks shown in Figs. 1 and 11, the center divider 20 is shown located between the wings w and w' extending from the right hand side of the side panels 2 and 2', and is shown foldably connected by score line 31 to the bottom forming edge of the center partition section 6 and is separated from the bottom forming edges of the cross partition 8 and securing flap 10 by a cut line 31' which is substantially in alignment with the folding score 31. The opposite edge of the center divider 20 is separated from the bottom forming edges of the center partition sections 6', cross partition 8' and securing flap 10' by a cut 32. However, the cut 32 is preferably interrupted at one or more points by uncut or breakable nick connections 32' to facilitate initial folding of the blank as shown in Figs. 2 and 3. Subsequently, as shown in Figs. 4 and 14, the nicks 32' are broken to permit folding of the center divider into carrier forming position as will be subsequently described.

In the blanks shown in Figs. 1 and 11, the end edges 13 and 14 of the bottom half section 1 and the end edges 13' and 14' of the bottom half section 1' have a slight taper inwardly towards the collapsing score 21 so that the ends of the bottom panel will be contained within the adjacent end panel sections 3 and 3', 4 and 4' when the assembled carrier is filled with bottles and placed in the distributing case. To maintain the carrier in erected form, a pair of foot lugs 15 and 15' are cut into the bottom forming edges of the center partition sections 5 and 5' to interlock with the free edges 13 and 13' of the bottom panel adjacent the bottom panel collapsing score 21 when the carrier is fully erected.

In the blank shown in Fig. 1, the handle forming extensions 11 and 11' are separated from the adjacent cross partitions 7 and 7' and securing flaps 9 and 9' by open ended slots 17 and 17' which provide hand holes and also define handle forming straps 19 and 19'. The handle forming extensions 12 and 12' are also separated from the cross partitions 8 and 8' and securing flaps 10 and 10' by open ended slots 16 and 16' which define the handle forming straps 18 and 18'. The top forming edges 33 and 33' of the end panels 3 and 3' may be attractively tapered from the lower top forming edges 34 and 34' of the side panels 2 and 2' to the higher top forming edges 35 and 35' of the center partition sections 5 and 5'. Likewise, the top forming edges 36 and 36' of the end panels 4 and 4' may also be given an attractive taper extending from the lower top forming edges 34 and 34' of the adjacent side panels 2 and 2' to the higher top forming edges 38 and 38' of the center partition sections 6 and 6'. If desired, the top edge 38 of the center partition section 6 and handle strap 18 may be in the form of a folding score from which a ridge forming flap 40 extends. The paired handle forming straps 18 and 18' may also be provided with edge rounding flaps 42 and 42' formed from material which would be otherwise removed from the hand hole slots 16 and 16' to thereby provide a comfortable finger engaging edge for the composite handle section.

To assemble the carrier from the blank shown in Fig. 1, areas of adhesive a and a' are first applied to the inside faces of the side wall securing flaps 10 and 10' as shown in Fig. 1. As the blank continues its passage through the gluing and folding machine, the right hand wing extensions of the blank are folded along the aligned scores 26 and 26' so as to place the center partition sections 6 and 6' in overlying relation to the inside face of the end panels 4 and 4', and to place the cross partitions 8 and 8' and the glued flaps 10 and 10' in overlying relation to the inside face of the side panels 2 and 2'. In the same operation, the center divider 20 is placed in partial overlying relation to the bottom half sections 1 and 1'. In the associated folding operation, the cross partitions 7 and 7' are folded along the aligned score lines 27 and 27' to place them in superimposed relation to the inside face of the adjacent center partition sections 5 and 5', with securing flaps 9 and 9' overlying the inside face of the end panels 3 and 3' as shown in Fig. 2.

In the second gluing operation, areas b and b' of adhesive are applied to the securing flaps 9 and 9', and areas of adhesive c and c' are applied to the folded outside face of the handle forming straps 18 and 18' as shown in Fig. 2.

In the second folding operation, the left hand wings of the blank shown in Fig. 2 are folded along the aligned score lines 23 and 23' so as to place the end panels 3 and 3', the cross partitions 7 and 7' and the previously glued securing flaps 9 and 9', in superimposed relation to the inside face of the side panels 2 and 2' as shown in Fig. 3. Upon the application of pressure to the thus folded blank, the glued securing flaps 9 and 9' and 10 and 10' become adhesively secured to the inside face of the side panels 2 and 2', thereby completing the assembly of the paired end cells at both ends of the carrier.

In the third gluing operation, an area d of adhesive is applied in the form of a strip to the infolded edge of the center partition section 5 to be subsequently covered by the adjacent edge of the center divider 20. In this same gluing operation, an area of adhesive e is applied to the infolded edge of the center partition section 6 to be covered by the adjacent edge of the subsequently folded center divider 20, care being taken to apply no adhesive to the intervening cross partition 8. As thus glued, the partially folded blank will appear as shown in Fig. 3.

In the third folding operation, the nicks 32' which connect the center divider 20 to the bottom forming edges of the center partition section 6' and cross partition 8' as shown in Fig. 3 are broken, and the center divider 20 is folded as shown in Fig. 4 along the score line 31 to overlie and become adhesively secured to the previously folded center partition sections 5 and 6, without securement to the intervening cross partition 8.

In the fourth gluing operation as shown in Fig. 4, areas of adhesive f, g and h are applied to the center partition sections 5 and 6 and the adjacent side portions of the folded center divider 20, and to the overlying handle forming strap 19, leaving unglued the intervening area occupied by the center divider 20 which is subsequently to be covered in the next folding operation by the cross partition 8'. The adhesive coated areas f, g and h as thus applied will correspond to the surface areas of the center partition sections 5' and 6' and the handle forming strap 19'.

Figure 5:
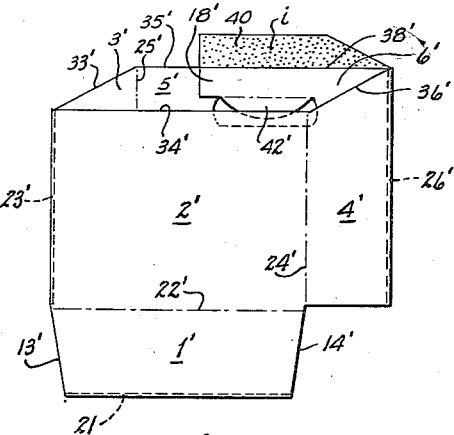
Fig. 5 is a plan view of the collapsed carrier as it would appear after the fourth folding operation has been performed on the blank shown in Fig. 4, this view also showing adhesive applied to the extended handle ridge flap preparatory to folding thereof.

In the fourth folding operation, the blank in the form shown in Fig. 4 is folded along the bottom panel collapsing score 21 so as to place the bottom half section 1' in overlying but unglued relation to the bottom half section 1, to place end panel 3' in overlying and unglued relation to the end panel 3, to place center partition section 5' in overlying and in glued relation to center partition section 5 and the adjacent side edge of the center divider 20, to place cross partition 8' in overlying and unglued relation to the center divider 20, to place center partition section 6' in overlying and in glued relation to the center partition section 6 and the adjacent edge of the center divider 20, and finally, to place the handle forming strap 19' in overlying and in glued relation to the handle forming strap 18. As thus folded, the blank will appear in the form of a collapsed carrier as shown in Fig. 5. In the event that the handle strap 18 is provided with a ridge forming flap 40, an area of adhesive $i$ is applied to the inside face thereof as shown in Fig. 5, and the ridge flap 40 then folded to overlie the adjacent face of the handle forming strap 18'. The collapsed carrier as thus fully assembled will appear as shown in Figs. 6, 7 and 8.

Figure 6:
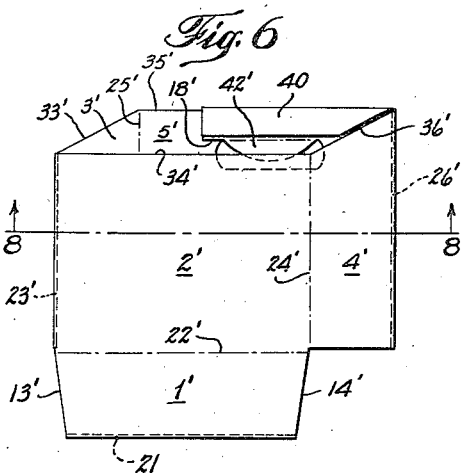
Fig. 6 is a plan view of the fully assembled carrier as it would appear in collapsed form after the gluing and folding operations above described have been performed on the blank shown in Fig. 1.

To erect the fully assembled but collapsed carrier as shown in Figs. 6, 7 and 8, the bottom panel at the collapsing score 21 is placed on a flat surface and downward pressure exerted thereon, thereby causing the carrier to become partially expanded into the form in Fig. 9. Complete expansion and erection of the carrier may be accomplished by shifting the handle section and associated center partition sections 5 and 5', 6 and 6' to the left as shown in Fig. 9, sufficient to effect hooking engagement between the foot lugs 15 and 15' and the adjacent end edges 13 and 13' of the botom panel as shown in Fig. 10.

The assembled carrier shown in Fig. 20 and the blank from which it is formed as shown in Fig. 11, is similar in construction to the carrier and its blank as shown in Figs. 10 and 1 respectively, and differ only in the construction of the handle section forming a part of the carrier shown in Fig. 20. In the carrier forming blank as shown in Fig. 11, the handle extensions 11 and 11' associated with the side wings $w$ and $w'$ at the left side of the blank, are separated by horizontally extending cuts 47 and 47' from the top forming edges of the cross partitions 7 and 7' and associated securing flaps 9 and 9', thereby providing unscored handle parts 49 and 49' extending laterally from the upper ends of the center partition sections 5 and 5' in adjacent overlying relation to the cross partitions 7 and 7' and securing flaps 9 and 9'. The handle parts 49 and 49' are also provided with hand hole cut-outs 51 and 51' as shown in Fig. 11.

The handle extensions 12 and 12' associated with the wings $w$ and $w'$ at the right hand side of the blank shown in Fig. 11, are also separated by horizontally extending cut lines 48 and 48' from the upper ends of the adjacent cross partitions 8 and 8' and associated securing flaps 10 and 10' to thereby define unbroken and unscored handle parts 50 and 50' extending laterally from the upper ends of the center partition sections 6 and 6' in adjacent overlying relation to the cross partitions 8 and 8' and securing flaps 10 and 10'. The handle parts 50 and 50' are also provided with hand hole cut-outs 52 and 52' located and shaped to align with one another and to also align with the hand hole cut-outs 51 and 51' in the handle parts 49 and 49' when the blank is assembled into carrier form.

As shown in Fig. 11, the top forming edges 55 and 55' of the handle parts 49 and 49' project above the top edges 54 and 54' of the adjacent side panels 2 and 2', and likewise, the top edges 58 and 58' of the handle parts 50 and 50' project above the top edges 54 and 54' of the adjacent side panels 2 and 2'. To further strengthen the carrier and enhance its appearance, a portion of the top forming edges 53 and 53' of the end panel sections 3 and 3' may be given an attractive upwardly inclined contour, and similarly, a portion of the top edges 56 and 56' of the end panel sections 4 and 4' may also be given an attractive upwardly inclined contour.

The handle section of this carrier may, if desirable, be further strengthened and its appearance enhanced by the provision of handle facing flaps 60 and 60' which are foldably connected by score lines 62 and 62' to the side edges of the adjacent handle parts 50 and 50'. It will be noted by referring to Fig. 11 that the folding scores 62 and 62' are formed as aligned continuations of the score lines 26 and 26', and that the handle facing flaps 60 and 60' are captured from sheet material located above the top edges of the side panels 2 and 2' and end panel sections 4 and 4' which would otherwise be discarded as waste. The longitudinal length of the handle facing flaps 60 and 60' are substantially equal to the overall length of the composite handle section and are so folded as to present their finished and decorated faces to view. The handle facing flaps 60 and 60' are also provided with hand hole cut-outs 64 and 64' which align with the hand hole cut-outs 52 and 52' of the handle forming parts 50 and 50' and the handle hole cut-outs 51 and 51' of the handle forming parts 49 and 49' when the carrier is assembled. The hand hole cut-outs 64 and 64' may also be provided with edge rounding flaps 66 and 66' captured from material which would be otherwise removed in the formation of the hand hole cut-outs.

In assemblying the bottle carrier from the blank shown in Fig. 11, areas of adhesive $a$ and $a'$ are first applied to the inside faces of the side wall securing flaps 10 and 10', and areas of adhesive $j$ and $j'$ are simultaneously applied to the inside faces of the handle forming parts 50 and 50' as shown in Fig. 1. During travel of the blank through the gluing and folding machine, the right wing extensions of the blank are folded along the aligned scores 26 and 26' to place the center partition sections 6 and 6' in overlying relation to the end panels 4 and 4', to place the cross partitions 8 and 8' and the glue flaps 10 and 10' in overlying relation to the inside face of the side panels 2 and 2', and to additionally place the glued handle forming parts 50 and 50' in overlying and in glued relation to the inside faces of the handle facing flaps 60 and 60'. In the same operation, the center divider 20 is placed in partial overlying relation to the bottom half sections 1 and 1'. Simultaneously with this folding operation, the cross partitions 7 and 7' are folded along the aligned score lines 27 and 27' to place them in superimposed relation to the inside face of the adjacent center partition sections 5 and 5', with the securing flaps 9 and 9' overlying the inside face of the end panels 3 and 3' as shown in Fig. 12.

In the second gluing operation, areas $b$ and $b'$ of adhesive are applied to the securing flaps 9 and 9', and areas of adhesive $k$ and $k'$ are applied to the inside faces of the handle forming parts 49 and 49' as shown in Fig. 12.

In the second folding operation, the left hand wings of the blank shown in Fig. 12 are folded along the aligned score lines 23 and 23' so as to place the end panels 3 and 3', the cross partition 7 and 7' and the previously glued securing flaps 9 and 9', in superimposed relation to the inside face of the side panels 2 and 2' as shown in Fig. 13. Upon the application of pressure to the thus folded blank, the glued flaps 9 and 9' and 10 and 10' become adhesively secured to the inside faces of the side panels 2 and 2', thereby completing the assembly of the paired end cells at both ends of the carrier.

In the third gluing operation, an area $d$ of adhesive is applied in the form of a strip to the infolded edge of the center partition section 5 to be subsequently covered by the adjacent side edge of the center divider 20. In the same gluing operation, an area of adhesive $e$ is applied to the infolded edge of the center partition section 6 to be covered by the adjacent side edge of the subsequently folded center divider 20, care being taken to apply no adhesive to the intervening cross partition 8. As thus glued, the partially folded blank will appear as shown in Fig. 13.

In the third folding operation, the nicks 32' which connect the center divider 20 to the bottom forming edges of the center partition 6' and cross partition 8' as shown in Fig. 13, are broken, and the center divider 20 is folded as shown in Fig. 4 along the score line 31 to overlie and become adhesively secured to the previously folded center partition sections 5 and 6, without securement to the intervening cross partition 8.

In the fourth gluing operation as shown in Fig. 14, areas of adhesive f, g and h are applied to the center partition sections 5 and 6 and the adjacent side edges of the folded center divider 20, and also to the overlying handle forming part 49, leaving unglued the intervening area occupied by the center divider 20 over which the cross partition 8' will next be folded. The adhesive coated areas f, g and h as thus applied will correspond to the surface areas of the center partition sections 5' and 6' and the handle forming part 49'.

In the fourth and final folding operation, the blank in the form shown in Fig. 14 is folded along the bottom panel collapsing score 21 so as to place the bottom half section 1' in overlying but unglued relation to the bottom half section 1, to place end panel 3' in overlying and unglued relation to the end panel 3, to place center partition section 5' in overlying and in glued relation to the center partition section 5 and the adjacent side edge of the center divider 20, to place cross partition 8' in overlying and unglued relation to the center divider 20, to place center partition section 6' in overlying and in glued relation to the center partition section 6 and the adjacent edge of the center divider 20, and finally, to place the handle forming part 49' in overlying and in glued relation to the handle part 49. As thus folded, a complete collapsed carrier as shown in Fig. 15 will have been formed from the blank as shown in Fig. 11.

To erect the fully assembled but collapsed carrier as shown in Figs. 15, 17 and 18, the bottom panel at the collapsing score 21 is placed on a flat surface and downward pressure exerted thereon, thereby causing the carrier to become partially expanded into the form shown in Fig. 19. Complete expansion and erection of the carrier may then be accomplished by shifting the handle section and associated center partition sections 5 and 5', 6 and 6' to the left as shown in Fig. 19 in sufficient amount to effect hooking engagement between the foot lugs 15 and 15' and the adjacent end edges 13 and 13' of the bottom panel as shown in Fig. 20.

The bottle carrier shown in Figs. 9 and 10 made from the blank shown in Fig. 1 and the bottle carrier shown in Figs. 19 and 20 made from the blank shown in Fig. 10, both present a composite center partition which is of double ply construction at both ends of the carrier, as formed by the center partition sections 5 and 5' adhesively secured together in back-to-back relation by the adhesive layer f and the center partition sections 6 and 6' secured together in back-to-back relation by adhesive g, thereby providing a very strong construction with which the composite handle section is associated. The center divider 20 which completes the composite center partition has substantial portions of the side edges thereof sandwiched between and in glued relation to the paired center partition sections 5 and 5' and 6 and 6'. The composite center partition also extends down to the bottom panel as erected, and are hingedly connected to the full length end panel sections 3 and 3' and 4 and 4'. A strong and durable carrier, unyielding to bottle weight, and strongly resistant to weaving action when loaded and carried, is thus provided.

The side panels 2 and 2' and the end panel sections 3 and 3' and 4 and 4' may be made in any desired height to adequately display the beverage bottles contained therein, and may be given any desired and attractive top edge contour. The cross partitions 7 and 7' and 8 and 8' may also be made full height and unbroken to provide strong and sturdy bottle confining cells, additionally supply added strength to the carrier. The side panels 2 and 2', the end panel sections 3 and 3' and 4 and 4' also present substantially flat and uninterrupted surfaces for clear and attractive advertising decoration. To facilitate the collapsing movement of the cross partitions, the score lines 27 and 27' and 28 and 28' as well as the score lines 29 and 29' and 30 and 30' may, if desired, be interrupted by spaced cuts as indicated in Figs. 1 and 11.

These carriers may be provided with composite handle sections comprising four to six layers of paperboard, and when glued together, form integral extensions of the composite double ply center partition sections 5 and 5' and 6 and 6', thereby providing a carrier of great strength and rigidity when erected, with a hand hole of sufficient thickness to make hand carriage both comfortable and convenient.

By sacrificing some strength to the advantage of some paperboard saving, the blank shown in Fig. 1 from which the carrier shown in Fig. 10 is formed, may be provided with only two handle straps 18 and 19 to thereby eliminate the paperboard material which forms the handle straps 18' and 19'. Alternatively, the handle straps 19 and 18' may be eliminated, leaving handle straps 18 and 19'. It will also be appreciated that the ridge forming flap 40 may also be eliminated without appreciable loss of strength, with corresponding paperboard savings in cutting.

The carrier shown in Fig. 20 formed from the blank shown in Fig. 11 may likewise be modified within the purview of this invention to effect saving of paperboard at some cost in strength. For example, the handle parts 49', 50' and 60' may be eliminated and only handle parts 49, 50 and 60 employed. Likewise, handle parts 49, 50' and 60' may be eliminated so that only handle parts 50, 60 and 49' are employed. Again, the handle parts 49 and 49' may be eliminated so that only handle parts 50 and 50' are employed to form the multi-ply handle section. The carriers of this invention are thus selectively adapted to effect further economies in the use of paperboard or fiberboard with some sacrifice in strength, but with sufficient remaining strength to be useful and adaptable as single service carriers which are not returned and discarded by the consumer.

It will also be noted that carriers constructed in accordance with this invention are balanced and symmetrical in appearance, and can be made in numerous attractive forms and patterns. These carriers are also so made as to present the finished and decorated side of the blank as the outer surfaces of the erected carrier, thereby providing a carrier of improved appearance, which need be printed and decorated on one side thereof only at a substantial saving in cost.

While certain novel features of this invention have been disclosed herein and are pointed out in the claims, it will be understood that various omissions, substitutions, and changes may be made by those skilled in the art without departing from the spirit of this invention.

What is claimed is:

1. A collapsible six-celled twin compartmented bottle carrier formed from a single blank of sheet material having a bottom panel formed by a pair of foldably connected bottom sections, a pair of side panels integrally hinged to the opposite side edges of the bottom panel, a pair of end panels at each end of the carrier integrally hinged to the adjacent end edges of the side panels, a pair of end center partition sections arranged in back-to-back relationship and integrally hinged to each pair of end panels, a fifth center partition section integrally hinged to a lower end portion of one of said end center partition sections and upfolded in overlapping relation thereto and wherein four of said five center partition sections have a maximum width which closely corresponds with the transverse width of the respective end panels, said fifth center partition section and end center partition sections being adhesively joined to provide a unitary and continuous center partition structure extending medially of the carrier and substantially down to the erected bottom panel for the full length thereof and dividing said carrier into twin compartments, a pair of cell defining cross partitions in each of said compartments having the lower edges thereof extending substantially down to the erected bottom panel, each of said cross partitions being integrally hinged to a separate center partition section and having a securing flap integrally hinged thereto and secured to the inside face of the adjacent side panel, an upper extension integral with one of said end center partition sections at one end of the carrier and a companion upper extension integral with one of said end center partition sections at the other end of the carrier, said upper extensions together providing a handle forming core projecting above the upper edges of the cross partitions and side panels and extending substantially the full length of the carrier and presenting a finger insertion cut-out therein positioned medially thereof and above the top edges of said cross partition sections and said fifth center partition section, and a pair of handle reinforcing flaps extending substantially the full length of the carrier and adhesively bonded to the exposed outer faces of said handle forming core and providing therewith a relatively rigid and unitary multi-ply handle part for the carrier, each of said handle reinforcing flaps having a finger insertion cut-out in aligned registry with the finger insertion cut-out in said handle forming core.

2. A collapsible six-celled twin compartmented bottle carrier formed from a single blank of sheet material having a bottom panel formed by a pair of foldably connected bottom sections, a pair of side panels integrally hinged to the opposite side edges of the bottom panel, a pair of end panels at each end of the carrier integrally hinged to the adjacent end edges of the side panels, an end center partition section extending longitudinally of the carrier medially between the side panels and integrally hinged to each end panel, a fifth center partition section integrally hinged to a lower end portion of one of said end center partition sections and upfolded in overlapping relation thereto and wherein four of said five center partition sections have a maximum width which closely corresponds with the transverse width of the respective end panels, said fifth center partition section and end center partition sections being adhesively joined to provide a unitary and continuous center partition structure extending medially of the carrier and substantially down to the erected bottom panel for the full length thereof and dividing said carrier into twin compartments, a pair of cell defining cross partitions in each of said compartments having the lower edges thereof substantially in the plane of the lower edge of said center partition structure, each of said cross partitions being integrally hinged to a separate center partition section and having a securing flap integrally hinged thereto and secured to the inside face of the adjacent side panel, an upper extension integral with one of said end center partition sections at one end of the carrier and a companion upper extension integral with one of said end center partition sections at the other end of the carrier, said upper extensions together providing a handle forming core projecting above the upper edges of the cross partitions and side panels and extending substantially the full length of the carrier and presenting a finger insertion cutout therein positioned medially thereof and above the top edge of said cross partitions and said fifth center partition section, and a pair of handle reinforcing flaps extending substantially the full length of the carrier and adhesively bonded to the exposed outer faces of said handle forming core and providing therewith a relatively rigid and unitary multiply handle part for the carrier, each of said handle reinforcing flaps having a finger insertion cut-out in aligned registry with the finger insertion cut-out in said handle forming core, at least one of said handle facing flaps being integrally hinged at one end thereof to the adjacent end edge of one of said upper extensions.

3. A collapsible six-celled twin compartmented bottle carrier formed from a single blank of sheet material having a bottom panel formed by a pair of foldably connected bottom sections, a pair of side panels integrally hinged to the opposite side edges of the bottom panel, a pair of end panels at each end of the carrier integrally hinged to the adjacent end edges of the side panels, a pair of end center partition sections arranged in back-to-back relationship and integrally hinged to each pair of end panels, a fifth center partition section integrally hinged to a lower end portion of one of said end center partition sections and upfolded in overlapping relation thereto and wherein four of said five center partition sections have a maximum width which closely corresponds to the transverse width of the respective end panels, said fifth center partition section and end center partition sections being adhesively joined to provide a unitary and continuous center partition structure extending medially of the carrier and substantially down to the erected bottom panel for the full length thereof and dividing said carrier into twin compartments, a pair of cell defining cross partitions in each of said compartments having the lower edges thereof extending substantially down to the erected bottom panel, each of said cross partitions being integrally hinged to a separate center partition section and having a securing flap integrally hinged thereto and secured to the inside face of the adjacent side panel, an upper extension integral with one of said end center partition sections at one end of the carrier and having a finger insertion hole therein, a companion upper extension integral with one of said end center partition sections at the other end of the carrier, said upper extensions together providing a handle forming core projecting above the upper edges of the cross partitions and side panels and extending substantially the full length of the carrier and presenting said finger insertion hole medially thereof and above the top edges of said cross partition sections and said fifth center partition section, and a pair of handle reinforcing flaps extending substantially the full length of the carrier and adhesively bonded to the exposed outer faces of said handle forming core and providing therewith a relatively rigid and unitary multi-ply handle part for the carrier, each of said handle reinforcing flaps having a finger insertion cut-out in aligned registry with the finger insertion cut-out in said handle forming core.

4. A rigidly assembled and collapsible six-cell twin compartmented bottle carrier formed from a single blank of sheet material including in combination, a bottom panel having a longitudinally extending collapsing score defining a pair of similar bottom panel sections, a pair of side panels integrally hinged to the opposite side edges of the bottom panel, a pair of end panel sections at each end of the carrier integrally hinged to the adjacent end edges of the side panels, a pair of end center partition sections at each end of the carrier adhesively bonded together in back-to-back relationship and integrally hinged to the adjacent pair of end panel sections and wherein each of said four end center partition sections have a maximum width which closely corresponds to the transverse width of the respective end panel sections, a cross partition section integrally hinged to each end center partition section and having a securing flap integrally hinged thereto and adhesively bonded to the inside face of the adjacent side panel, a single center divider panel integrally hinged to a lower edge portion of one of said center partition sections and upfolded in overlapping relation thereto, said center divider panel having the opposite end edges thereof sandwiched between both pairs of end center partition sections at opposite ends of the carrier and providing with said end center partition sections a unitary and continuous center partition structure extending medially of the carrier and substantially down to the erected bottom panel for the full length thereof and dividing the carrier into twin compartments, an upper extension integral with one of said end center partition sections and a companion upper extension integral with one of said end center partition sections at the other end of the carrier, said upper extensions together providing a handle forming core projecting above the upper edges of the cross partition sections and side panels and extending substantially the full length of the carrier and presenting a finger insertion cut-out therein positioned medially thereof and above the top edge of said cross partition sections and said center divider panel, and a pair of handle reinforcing flaps extending substantially the full length of the carrier and adhesively bonded to the outer faces of said handle forming core and providing therewith a relatively rigid and unitary multi-ply handle part for the carrier, each of said handle reinforcing flaps having a finger insertion cut-out in aligned registry with the finger insertion cut-out in said handle forming core.

5. A rigidly assembled and collapsible six-cell twin compartmented bottle carrier formed from a single blank of sheet material including in combination, a bottom panel having a longitudinally extending collapsing score defining a pair of similar bottom panel sections, a pair of side panels integrally hinged to the opposite side edges of the bottom panel, a pair of end panel sections at each end of the carrier integrally hinged to the adjacent end edges of the side panels, a pair of end center partition sections at each end of the carrier adhesively bonded together in back-to-back relationship and integrally hinged to the adjacent pair of end panel sections and wherein each of said four end center partition sections have a maximum width which closely corresponds to the transverse width of the respective end panel sections, a cross partition section integrally hinged to each end center partition section and having a securing flap integrally hinged thereto and adhesively bonded to the inside face of the adjacent side panel, a single center divider panel integrally hinged to a lower edge portion of one of said end center partition sections and adhesively secured in upfolded and overlapping relation thereto, said center divider panel having the opposite end edges thereof adhesively bonded to and between both pairs of end center partition sections at opposite ends of the carrier and providing with said end center partition sections a unitary and continuous center partition structure extending medially of the carrier and substantially down to the erected bottom panel for the full length thereof and dividing the carrier into twin compartments, an upper extension integral with one of said end center partition sections and a companion upper extension integral with one of said end center partition sections at the other end of the carrier, said upper extensions together providing a handle forming core projecting above the upper edges of the cross partition sections and side panels and extending substantially the full length of the carrier and presenting a finger insertion cut-out therein positioned medially thereof and above the top edge of said cross partition sections and said center divider panel, and a pair of handle reinforcing flaps extending substantially the full length of the carrier and adhesively bonded to the outer faces of said handle forming core and providing therewith a relatively rigid and unitary multi-ply handle part for the carrier, each of said handle reinforcing flaps having a finger insertion cut-out in aligned registry with the finger insertion cut-out in said handle forming core, at least one of said handle forming flaps being integrally hinged at one end thereof to the adjacent end edge of one of said upper extensions.

6. A six-cell twin compartmented article carrier forming blank which includes, a bottom panel having a longitudinal extending collapsing score, a pair of side panels integrally hinged to the opposite side edges of said bottom panel, an end panel section integrally hinged to each end edge of both side panels, an end wing integrally hinged by a transverse score to each end panel section and having a longitudinal length greater than two-thirds of the longitudinal length of the adjacent side panel, an intermediate wing captured from material between one pair of adjacent end wings and integrally hinged along a bottom edge portion thereof to a lower edge portion of one of said end wings, said intermediate wing having a maximum longitudinal length which is greater than two-thirds of the longitudinal length of the respective side panels and having its inner free end edge adjacent to but outwardly of the aligned and hinged end edges of the adjacent end wings, four of said wings each having a pair of transversely extendinng substantially parallel scores which define an end center partition section, a cross partition section and a side panel securing flap and wherein each of said four end center partition sections have a maximum width which closely corresponds to the transverse width of the respective end panel sections, one of said end wings at one end of the blank and another of said end wings at the other end of the blank each having an upper extension projecting above the top edges of the adjacent end panel sections and side panels, said upper extensions together providing a handle forming core designed to extend substantially the full length of the carrier as assembled and presenting a finger insertion cut-out medially thereof, and a handle reinforcing flap having a length substantially equal to the length of the respective side panels and integrally hinged at one end thereof to the adjacent vertical edge of one of said upper extensions, said handle reinforcing flap being designed to be adhesively secured to a side face of said handle forming core and having a finger insertion cut-out therein positioned to register with the finger insertion cut-out in the handle forming core of the assembled carrier, said handle reinforcing flap being separable from the upper edge of the adjacent end panel section and adjacent side panel.

7. A six-cell twin compartmented article carrier forming blank which includes, a bottom panel having a longitudinal extending collapsing score, a pair of side panels integrally hinged to the opposite side edges of said bottom panel, an end panel section integrally hinged to each end edge of both side panels, an end wing integrally hinged by a transverse score to each end panel section and having a longitudinal length greater than two-thirds of the longitudinal length of the adjacent side panel, an intermediate wing captured from material between one pair of adjacent end wings and integrally hinged along a bottom edge portion thereof to a lower edge portion of one of said end wings, said intermediate wing having a maximum longitudinal length which is greater than two-thirds of the longitudinal length of the respectively side panels and having its inner free end edge adjacent to but outwardly of the aligned and hinged end edges of the adjacent end wings, four of said wings each having a pair of transversely extending substantially parallel scores which define an end center partition section, a cross partition section and a side panel securing flap, and wherein each of said four end center partition sections have a maximum width which closely corresponds to the transverse width of the respective end panel sections one of said end wings at one end of the blank having an upper extension presenting a finger insertion cut-out therein and another of said end wings at the other end of the blank having a companion upper extension, said upper extensions projecting above the top edges of the adjacent end panel sections and side panels and together providing a handle forming core designed to extend substantially the full length of the carrier as assembled and presenting said finger insertion cut-out medially thereof, and a handle reinforcing flap having a length substantially equal to the length of the respective side panels and integrally hinged at one end thereof to the adjacent vertical edge of one of said upper extensions, said handle reinforcing flap being designed to be adhesively secured to a side face of said handle forming core and having a finger insertion cut-out therein positioned to register with the finger insertion cut-out in the handle forming core of the assembled carrier, said handle reinforcing flap being separable from the upper edge of the adjacent end panel section and adjacent side panel.

8. A six-cell twin compartmented article carrier forming blank which includes, a bottom panel having a longitudinal extending collapsing score, a pair of side panels integrally hinged to the opposite side edges of said bottom panel, an end panel section integrally hinged to each end edge of both side panels, an end wing integrally hinged by a transverse score to each end panel section and having a longitudinal length greater than two-thirds of the longitudinal length of the adjacent side panel, an intermediate wing captured from material between one pair of adjacent end wings and integrally hinged along a bottom edge portion thereof to a lower edge portion of one of said end wings and releasably connected at the top edge thereof by a breakable portion to the bottom end of the other adjacent end wing, said intermediate wing having a maximum longitudinal length which is greater than two-thirds of the longitudinal length of the respective side panels and having its inner free end edge adjacent to but outwardly of the aligned and hinged end edges of the adjacent end wings, each of said end wings having a pair of transversely extending substantially parallel scores which define an end center partition section, a cross partition section and a side panel securing flap and wherein each of said four end center partition sections have a maximum width which closely corresponds to the transverse width of the respective end panel sections, one of said end wings at one end of the blank and another of said end wings at the other end of the blank each having an upper extension projecting above the top edges of the adjacent end panel sections and side panels, said upper extensions together providing a handle forming core designed to extend substantially the full length of the carrier as assembled and having a finger insertion cut-out medially thereof, and a handle reinforcing flap having a length substantially equal to the length of the respective side panels and integrally hinged at one end thereof to the adjacent vertical edge of one of said upper extensions, said handle reinforcing flap being designed to be adhesively secured to a side face of said handle forming core and having a finger insertion cut-out therein positioned to register with the finger insertion cut-out in the handle forming core of the assembled carrier, said handle reinforcing flap being separable from the upper edge of the adjacent end panel and adjacent side panel.

9. The method of forming a collapsible six-cell twin compartmented bottle carrier from a one-piece blank presenting a pair of similar bottom panel sections foldably joined by a longitudinal score, a pair of side panels foldably hinged by longitudinal scores to the opposite side edges of said bottom panel sections, an end panel integrally hinged by a transverse score to each end edge of each side panel, an end wing extending laterally from each of said end panel sections, each of said end wings presenting an end center partition section integrally hinged to the adjacent end panel section by a transverse score, a cross partition integrally hinged to the adjacent center partition section by a transverse score, and a securing flap integrally hinged to the cross partition along a transverse score, and a center divider panel captured from material between one pair of adjacent end wings and integrally hinged by a longitudinal score along a bottom edge portion thereof to a lower edge portion of the end center partition section of one of said end wings and releasably connected at the top edge thereof to the bottom end of the other adjacent end wing, said center divider panel and four end center partition sections being designed to provide a continuous center partition structure for the assembled carrier; said method including, infolding said center divider panel and adjacent end wings along their aligned end panel hinging scores so as to place the securing flaps associated with said wings in secured relation to the inside face of the adjacent side panels and said center divider panel in overlying relation to an end portion of said bottom panel sections, substantially simultaneously infolding the paired cross partitions associated with the paired end wings at the opposite end of the blank along their aligned center partition section hinging scores into overlying relation to the adjacent end center partition sections thereof, thereafter infolding the paired end panel sections at said opposite end of the blank along their aligned transverse side panel hinging scores into overlying relation to the inside face of the side panels so as to place the securing flaps associated with the end wings thereof in secured relation to the inside face of the adjacent side panels, releasing the top edge of said center divider panel and upfolding and downfolding said panel into overlying and secured relation to the infolded end center partition sections overlying one of said side panels, and folding said bottom panel sections along their longitudinal connecting score so as to place both pairs of infolded end center partition sections in paired overlying secured relation with the end edges of said center divider panel sandwiched therebetween.

10. The method of forming a collapsible six-cell twin compartmented bottle carrier from a one-piece blank presenting a pair of similar bottom panel sections foldably joined by a longitudinal score, a pair of side panels integrally hinged by longitudinal scores to the opposite side edges of said bottom panel sections, an end panel hinged by a transverse score to each end edge of each side panel, an end wing extending laterally from each of said end panel sections, each of said end wings presenting an end center partition section integrally hinged to the adjacent end panel by a transverse score, a cross partition integrally hinged to the adjacent center partition section by a transverse score, and a securing flap integrally hinged to the cross partition along a transverse score, an upper extension integral with each of two of said end center partition sections at opposite ends of the blank which together provide a handle forming core presenting a finger insertion cut-out when the carrier is assembled, a handle reinforcing flap integrally hinged at one end thereof to the adjacent vertical edge of one of said upper extensions, and a center divider panel captured from material between one pair of adjacent end wings and hinged by a longitudinal score along a bottom edge portion thereof to a lower edge portion of the end center partition section of one of said end wings and releasably connected at the top edge thereof to the bottom end of the other adjacent end wing, said center divider panel and four end center partition sections being designed to provide a continuous center partition structure for the assembled carrier; said method including, infolding said center divider panel and adjacent end wings along the aligned end panel hinging scores thereof so as to respectively place the securing flaps and upper extension associated with one of said end wings in secured relation to the inside face of the adjacent side panels and in secured relation to said handle reinforcing flap and to place said center divider panel in unsecured and partially overlying relation to said bottom panel sections, substantially simultaneously infolding the paired cross partitions associated with the paired end wings at the opposite end of the blank along their aligned center partition section hinging scores into overlying and unsecured relation to the adjacent end center partition sections thereof, thereafter infolding the paired end panels at said opposite end of the blank along their side panel hinging scores so as to place the securing flaps and the upper extension associated with one of the end wings thereof respectively in secured relation to the inside face of the adjacent side panels and in secured relation to the adjacent portion of said handle reinforcing flap, releasing the top edge of said center divider panel and upfolding and downfolding said panel into overlying and secured relation to the infolded end center partition sections overlying one of said side panels, and folding said bottom panel sections along their longitudinal connecting score so as to place both pairs of infolded end center partition sections in paired overlying secured relation with the end edges of said center divider panel sandwiched therebetween.

References Cited in the file of this patent

UNITED STATES PATENTS

| | | |
|---|---|---|
| Re. 23,501 | Lighter | May 20, 1952 |
| Re. 23,871 | Castle | Sept. 21, 1954 |
| 1,157,712 | Miller | Oct. 26, 1915 |
| 2,289,859 | Arthur | July 14, 1942 |
| 2,345,746 | Goodyear | Apr. 4, 1944 |
| 2,458,281 | Lupton | Jan. 4, 1949 |
| 2,525,686 | Kowal | Oct. 10, 1950 |
| 2,537,615 | Arneson | Jan. 9, 1951 |
| 2,539,304 | Hall | Jan. 23, 1951 |
| 2,658,659 | Hall | Nov. 10, 1953 |
| 2,696,942 | Ringler | Dec. 14, 1954 |